Patented Aug. 5, 1947

2,425,267

UNITED STATES PATENT OFFICE 2,425,267

PROCESS OF MANUFACTURING ACRYLONITRILE FROM ACETYLENE AND HCN

Walter A. Schulze and John E. Mahan, Bartlesville, Okla., assignors to Phillips Petroleum Company, a corporation of Delaware No Drawing. Application October 21, 1944, Serial No. 559,840

1 Claim. (Cl. 260—464)

This invention relates to the production of alpha-unsaturated aliphatic nitriles.

The alpha-unsaturated aliphatic nitriles may be represented by the formula

wherein R and R' may represent hydrogen atoms, alkyl and alkenyl groups. In accordance with the present invention these compounds are formed by the vapor phase reaction of hydrogen cyanide with an aliphatic acetylenic hydrocarbon in the presence of novel catalysts more fully disclosed hereinafter. The catalysts of the present invention are capable of promoting the direct addition reaction of hydrogen cyanide with acetylene and its aliphatic homologs.

During the last decade, alpha-unsaturated nitriles and particularly the parent compound acrylonitrile have assumed increasing industrial importance through their employment as comonomers in polymerization reactions. Of especial significance is the current large scale use of acrylonitrile in butadiene polymerization systems whereby copolymers are produced which may be compounded and vulcanized to produce the oil-resistant Buna N rubber. The full potentialities of this type of synthetic rubber have not been exploited due to the expense and the present inadequate source of acrylonitrile and its aliphatic homologs. Thus one well-known commercial process for the production of acrylonitrile utilizes ethylene oxide and hydrogen cyanide to produce ethylene cyanohydrin which is in turn dehydrated to the desired acrylonitrile. Since ethylene oxide is itself a synthetic product, at least three separate chemical reactions, each with its attendant expense, are involved in proceeding from the basic raw materials, ethylene and hydrogen cyanide, to the finished product.

The value of a direct synthesis of acrylonitrile from acetylene and hydrogen cyanide is obvious, but reported progress along this route has been very scanty. The direct union of acetylene and hydrogen cyanide in the presence of aqueous cuprous chloride catalysts has been proposed but corrosion problems coupled with low yields and operational difficulties have hindered this development. The use of solid contact catalysts, as disclosed in the prior art, appears to be limited to metal cyanides with particular reference to barium cyanide.

An object of this invention is to provide a process for the preparation of alpha-unsaturated aliphatic nitriles.

Another object is to provide such a process in which hydrogen cyanide is reacted with an aliphatic acetylenic hydrocarbon.

Still another object is to provide novel catalysts for carrying out this reaction.

Other objects and advantages of our invention will become apparent in the light of the subsequent disclosure.

We have found that the synthesis of acrylonitrile and its homologs is smoothly and efficiently accomplished as a gas-phase reaction involving hydrogen cyanide and an acetylenic hydrocarbon. In its broader aspects, the operation of the present process involves the passage of intimately mixed gaseous hydrogen cyanide and the acetylenic hydrocarbon at a temperature within the range of from about 300° to about 1500° F. over a normally solid metal of group 2b of the periodic table or more preferably the oxide or thermally stable salt of said metal. The normally solid metals of group 2b of the periodic table are zinc and cadmium. The alpha-unsaturated nitrile may be recovered from the effluent of said catalyst by fractional distillation or by other suitable means of separation.

In a preferred embodiment of our invention, equimolecular proportions of hydrogen cyanide and acetylene are charged to a reaction zone containing a catalyst comprising a substantially inert porous carrier, e. g., pumice, impregnated with zinc oxide. The temperature of the reaction zone is maintained within the range of 770 to 970° F. and the feed rate so controlled as to give a residence or contact time of from 6 to 8 seconds. The effluent stream is processed to effect recovery of unconverted acetylene and hydrogen cyanide, and acrylonitrile. A rough separation of unconverted acetylene from the effluent may be made by partial condensation of the effluent, the acetylene remaining uncondensed. The condensate may then be freed from hydrogen cyanide by washing with water or by fractional distillation. The acrylonitrile is ordinarily recovered as a distillate boiling between 75 and 78° C.

In the successful operation of the present process, selection of catalytic materials and their mode of application are of primary importance. We have found that with the exception of mercury, the metals of group 2b of the periodic table and more particularly the oxides and certain inorganic salts of these metals when properly applied, are capable of catalyzing the reactions of this invention. Since both acetylene and hydrogen cyanide are prone to enter into exothermic decomposition and polymerization reactions considerable care must be exercised in the selection of catalyst supports and their mode of application in order to avoid excessive coking. Thus, catalytically active catalysts carriers such as silica gel, bauxite, fuller's earth, kaolin and the like exert a pronounced cracking action on acetylene and in undiluted feed streams are apt to result in short operating periods due to excessive coking. However, the above mentioned carriers have been satisfactorily applied in the present process provided the hydrogen cyanide-acetylene feed stream is diluted with two or more mols of an inert diluent, such as nitrogen, per mol of feed mixture. In cases where a diluent is undesirable, we have found that satisfactory catalyst supports should be substantially inert toward the reactants under normal operating conditions. Representative materials fulfilling this requirement are asbestos fibers and pumice. Asbestos is especially applicable in the preparation of catalyst from dry powdered material such as the metal catalysts of this invention. Thus, by tumbling zinc dust and asbestos together, a porous contact catalyst containing from 70 to 80 per cent by weight of zinc can be prepared. Catalytic materials are applied to pumice and other granular adsorbent carriers in the form of aqueous pastes or solutions which are subsequently dried at temperatures contemplated in the reaction proper. The metal catalyst components include magnesium, cadmium and zinc. While the elementary metals are effective catalysts, they are not preferred under conditions involving regeneration with air and/or steam to burn off carbonaceous deposits. Salts of cadmium and zinc are selected from those compounds thermally stable at temperatures above about 300° F. and may include acetates, phosphates, sulfates, halides, cyanides and other heat stable salts not ordinarily classed as oxidizing agents. Since the present invention is ordinarily operated as a cycle process involving periodic regeneration periods wherein carbonaceous deposits are removed from the catalyst by means of air and/or steam, the catalysts of choice must be capable of withstanding the regenerative treatment without undergoing deterioration and loss of catalytic activity. Our preferred catalysts, therefore, are the oxides of zinc and cadmium used alone or in admixture with one another. In many instances active catalysts have been realized through the use of mixtures of the above oxides with the corresponding salts as exemplified by our zinc oxide-zinc phosphate composition.

Hydrocarbon intermediates of the present process include acetylene and its alkyl and alkenyl homologs. While this invention is primarily concerned with the synthesis of acrylonitrile from acetylene, other valuable alpha-unsaturated nitriles may be prepared from such alkynes as methylacetylene, ethylacetylene, vinylacetylene, dimethylacetylene, diethylacetylene and divinylacetylene as well as with mixed alkyl-alkenyl acetylenes.

Reaction conditions leading to optimum yields of alpha-unsaturated nitriles must be individually determined for each system. However, the following generalizations will lead to operable processes with virtually any of the indicated acetylenic hydrocarbons. Ordinarily low pressures ranging from atmospheric to low superatmospheric are preferred due to the well-known hazards involved in working with acetylenic hydrocarbons. In the absence of inert diluents pressures in excess of about 50 pounds gage are not recommended. However, if inert diluents, such as nitrogen, methane or the like are used, pressures up to about 300 pounds gage may be employed. Reaction temperatures are determined largely by the nature of the acetylene employed and the activity of the catalyst and may vary from about 300 to about 1500° F. with intermediate values of from 400 to 1200° F. being adequate in most instances. Under the pressure and temperature ranges specified the residence time of the reactants in the catalyst zone may vary from about 0.5 to 10 seconds. At atmospheric pressure, residence values are ordinarily maintained between about 1 to 8 seconds.

In further illustration of the operation of this invention the following specific examples are offered.

EXAMPLE I

The production of acrylonitrile from the interaction of acetylene and hydrogen cyanide is effected as a vapor phase reaction over a zinc oxide catalyst. The catalyst is prepared by tumbling powdered zinc oxide with asbestos to obtain a porous material comprising 74.5 per cent by weight of zinc oxide. The acetylene and hydrogen cyanide are metered in equimolecular proportions to a mixing zone and are then charged to an electrically heated catalyst case containing the zinc oxide-asbestos catalyst. The effluent gases from the reaction zone are passed through a water-cooled condenser into a trap cooled with an acetone-dry ice mixture. Any uncondensed gas is vented while the condensed liquid product is withdrawn, diluted with water and charged to a still. The overhead material boiling below 97° C. is washed free of hydrogen cyanide with 30 per cent sodium hydroxide solution and refractionated to recover acrylonitrile boiling between 75–78° C. The product is identified by means of its physical constants and the formation of a solid polymer when treated with benzoyl peroxide.

*Summary*

Feed rate:
    Acetylene _____mol/hr__ 0.5
    Hydrogen cyanide _____mol/hr__ 0.5
Catalyst weight_____grams__ 43
Contact time (av.)_____seconds__ 6.5
Reaction temperature _____°F__ 770–1000
Acrylonitrile yield, mol % of theory
    (basis: HCN charged)_____ 18

EXAMPLE II

Acrylonitrile is prepared by the gas phase reaction of acetylene and hydrogen cyanide over a catalyst consisting of zinc cyanide supported on asbestos fiber. The general technique involved in accomplishing the synthesis is essentially the same as described in Example I.

*Summary*

Zinc cyanide-asbestos catalyst (71%
    Zn(CN)$_2$) _____grams__ 34
Feed rate:
    Acetylene _____mol/hr__ 0.67
    Hydrogen cyanide _____mol/hr__ 0.33
    Nitrogen _____mol/hr__ 0.33
Contact time (av.)_____seconds__ 4.5
Reaction temperature_____°F__ 550–850
Acrylonitrile yield, mol % of theory
    (basis: HCN charged)_____ 11
Boiling range of acrylonitrile product
    °C__ 75–77

EXAMPLE III

The preparation of acrylonitrile from acetylene and hydrogen cyanide is carried out by passing the said gaseous reactants over a catalyst consisting of zinc dust supported on asbestos fiber.

The catalyst is prepared by tumbling asbestos fibers and zinc dust until the fibers have adsorbed about 3.3 parts by weight of zinc per part of asbestos. The reaction procedure is essentially that of Example I.

*Summary*

Catalyst (77% Zn on asbestos)
grams__ 52
Feed rate:
  Acetylene _____mol/hr__ 0.5
  Hydrogen cyanide _____mol/hr__ 0.5
Reaction temperature _____°F__ 920–1120
Contact time_____seconds__ 3.5
Acrylonitrile yield, mol % of theory (basis: HCN charged)_____ 13.5

EXAMPLE IV

Synthesis of acrylonitrile from acetylene and hydrogen cyanide is effected in the presence of a mixture of zinc oxide and zinc phosphate supported on pumice. The catalyst was prepared by adding pumice (6–14 mesh) with stirring to a thin aqueous paste of zinc oxide. After substantially complete adsorption of the paste, the composition is evaporated to dryness. The dry material containing 25 per cent zinc oxide is then sprayed with aqueous phosphoric acid to give an $H_3PO_4$ content in the dry catalyst equivalent to 5 per cent by weight. After adding the aqueous phosphoric acid, the catalyst is heated to 800–900° F. to drive off water and to effect the formation of zinc phosphate. The final catalyst composition is as follows: ZnO, 18 per cent, $Zn_3(PO_4)_2$, 10 per cent; pumice, 72 per cent. The reaction carried out as in Example I resulted in a 13 mol per cent yield of acrylonitrile based on HCN charged.

EXAMPLE V

Acrylonitrile is synthesized from acetylene and hydrogen cyanide by passing the reactants at conversion temperatures over a catalyst consisting of cadmium oxide supported on asbestos fiber. The catalyst is prepared as previously described in Example I to give a composition containing 71 per cent cadmium oxide. The gaseous reactants in equimolecular proportions were passed in intimate admixture over the catalyst at atmospheric pressure and at temperatures ranging from 740–820° F. The contact time varied between 4 and 5 seconds. A conversion of 3 mol per cent of HCN to acrylonitrile was realized in a single pass over the catalyst.

EXAMPLE VI

Catalysis of the gaseous system acetylene-hydrogen cyanide to produce acrylonitrile is effected in the presence of pumice impregnated with cadmium acetate. The catalyst is prepared by treating pumice with an aqueous solution of cadmium acetate and drying at 500° F. in a stream of nitrogen. The general procedure of Example I was followed in carrying out the reaction.

*Summary*

Feed rate:
  Acetylene _____mol/hr__ 1
  Hydrogen cyanide _____mol/hr__ 0.5
  Inert diluent (nitrogen)___mol/hr__ 1
Temperature _____°F__ 450–750

The yield per pass of acrylonitrile based on HCN charged amounts to from 1.5 to 2 per cent over an operating period of 6.5 hours.

EXAMPLE VII

The chemical combination of acetylene and hydrogen cyanide to produce acrylonitrile is accomplished over a zinc oxide catalyst supported on silica gel. The catalyst is prepared by evaporating to dryness a stirred solution of zinc nitrate containing suspended silica gel. The partially dry granules are then heated at 800–900° F. in a stream of air to convert the nitrate to the oxide. In this instance the final catalyst composition comprised 20 per cent zinc oxide and 80 per cent silica gel. The reaction, in the presence of the active silica gel support, is carried out in the presence of an inert diluent in order to reduce the decomposition of acetylene. The reaction is accomplished as a continuous flow procedure with the processing of the effluent stream accomplished as in Example I.

*Summary*

Catalyst volume _____Ml__ 150
Feed rate:
  Hydrogen cyanide _____Mol/hr__ 0.33
  Acetylene _____Mol/hr__ 0.38
  Nitrogen _____Mol/hr__ 2.5
Temperature range _____°F__ 870–1050
Contact time_____seconds__ 1
Acrylonitrile yield, mol % of theory___ 8

In addition to acrylonitrile, propionitrile was isolated from the products in a yield of about 2.5 mol per cent based on HCN charged.

EXAMPLE VIII

A reaction similar to that of Example VII was carried out over a catalyst comprising zinc oxide (20%) on bauxite (80%). In this instance the catalyst was prepared by agitating a solution of zinc acetate containing suspended 6–14 mesh bauxite while adding just enough ammonium hydroxide to cause complete precipitation of zinc hydroxide. The wet particles were then dried at 900–1000° F. in a stream of air to drive off ammonium acetate and to convert the hydroxide to the corresponding oxide. Reaction conditions in the presence of this catalyst were the same as cited in Example VII with the production of acrylonitrile in a yield of about 10 mol per cent based on HCN charged.

We claim:

A process for the preparation of acrylonitrile which comprises reacting hydrogen cyanide with acetylene in vapor phase at a temperature within the range of 770 to 970° F. for a period of time within the range of 6 to 8 seconds in the presence of a catalyst comprising from 70 to 80 weight per cent zinc in the form of finely divided zinc oxide supported on asbestos fiber.

WALTER A. SCHULZE.
JOHN E. MAHAN.

REFERENCES CITED

The following references are of record in the file of this patent:

UNITED STATES PATENTS

| Number | Name | Date |
|---|---|---|
| 2,187,745 | Lazier | Jan. 23, 1940 |
| 2,385,551 | Spence | Sept. 25, 1945 |

FOREIGN PATENTS

| Number | Country | Date |
|---|---|---|
| 217,478 | Switzerland | Feb. 2, 1942 |
| 332,635 | Great Britain | July 22, 1930 |
| 559,734 | Germany | Sept. 23, 1932 |